(12) United States Patent
Hubert

(10) Patent No.: US 7,536,429 B2
(45) Date of Patent: May 19, 2009

(54) MULTIPLIER WITH LOOK UP TABLES

(75) Inventor: Gerardus T. M. Hubert, Geldrop (NL)

(73) Assignee: NXP B.V., Eindhoven (NL)

( * ) Notice: Subject to any disclaimer, the term of this patent is extended or adjusted under 35 U.S.C. 154(b) by 831 days.

(21) Appl. No.: 10/536,818

(22) PCT Filed: Nov. 11, 2003

(86) PCT No.: PCT/IB03/05095

§ 371 (c)(1),
(2), (4) Date: May 27, 2005

(87) PCT Pub. No.: WO2004/051456

PCT Pub. Date: Jun. 17, 2004

(65) Prior Publication Data

US 2006/0020654 A1 Jan. 26, 2006

(30) Foreign Application Priority Data

Nov. 29, 2002 (GB) ................................. 0227793.7

(51) Int. Cl.
*G06F 7/72* (2006.01)
(52) U.S. Cl. ..................................................... 708/491
(58) Field of Classification Search .................. 708/491
See application file for complete search history.

(56) References Cited

U.S. PATENT DOCUMENTS

| 4,864,529 | A | | 9/1989 | Shah et al. | |
|---|---|---|---|---|---|
| 6,915,322 | B2 | * | 7/2005 | Hong | .......................... 708/625 |
| 7,024,444 | B1 | * | 4/2006 | Green | ......................... 708/620 |
| 7,389,317 | B2 | * | 6/2008 | Guttag et al. | ............... 708/620 |
| 2003/0084083 | A1 | * | 5/2003 | Hull et al. | .................... 708/620 |
| 2003/0182340 | A1 | * | 9/2003 | Horie | ......................... 708/491 |
| 2003/0182343 | A1 | * | 9/2003 | Hojsted | ...................... 708/625 |

FOREIGN PATENT DOCUMENTS

WO   WO 02/03608   1/2002

* cited by examiner

*Primary Examiner*—David H Malzahn

(57) ABSTRACT

A method of performing modular multiplication of integers X and Y to produce a result R, where R=X.Y mod N, in a multiplication engine. X is fragmented into a first plurality of words xn each having a first predetermined number of bits, k and Y is fragmented into a second plurality of words $y_n$ each having a second predetermined number of bits, m. Multiples of a word $x_n$ of X are derived in a pre calculation circuit and subsequently used to derive products of the word $x_n$ of X with each of the plurality of words $y_n$ of Y. An intermediate result $R_j$ is calculated as a cumulating sum derived from said pre-calculated multiples and the steps repeated for each successive word of X so as to generate successive intermediate results, $R_j$, for each of the first plurality of words $x_n$. The final result, R is obtained from the last of the intermediate results $R_{n-1}$.

20 Claims, 4 Drawing Sheets

MULTIPLIER WITH LOOK UP TABLES

Figure 1:
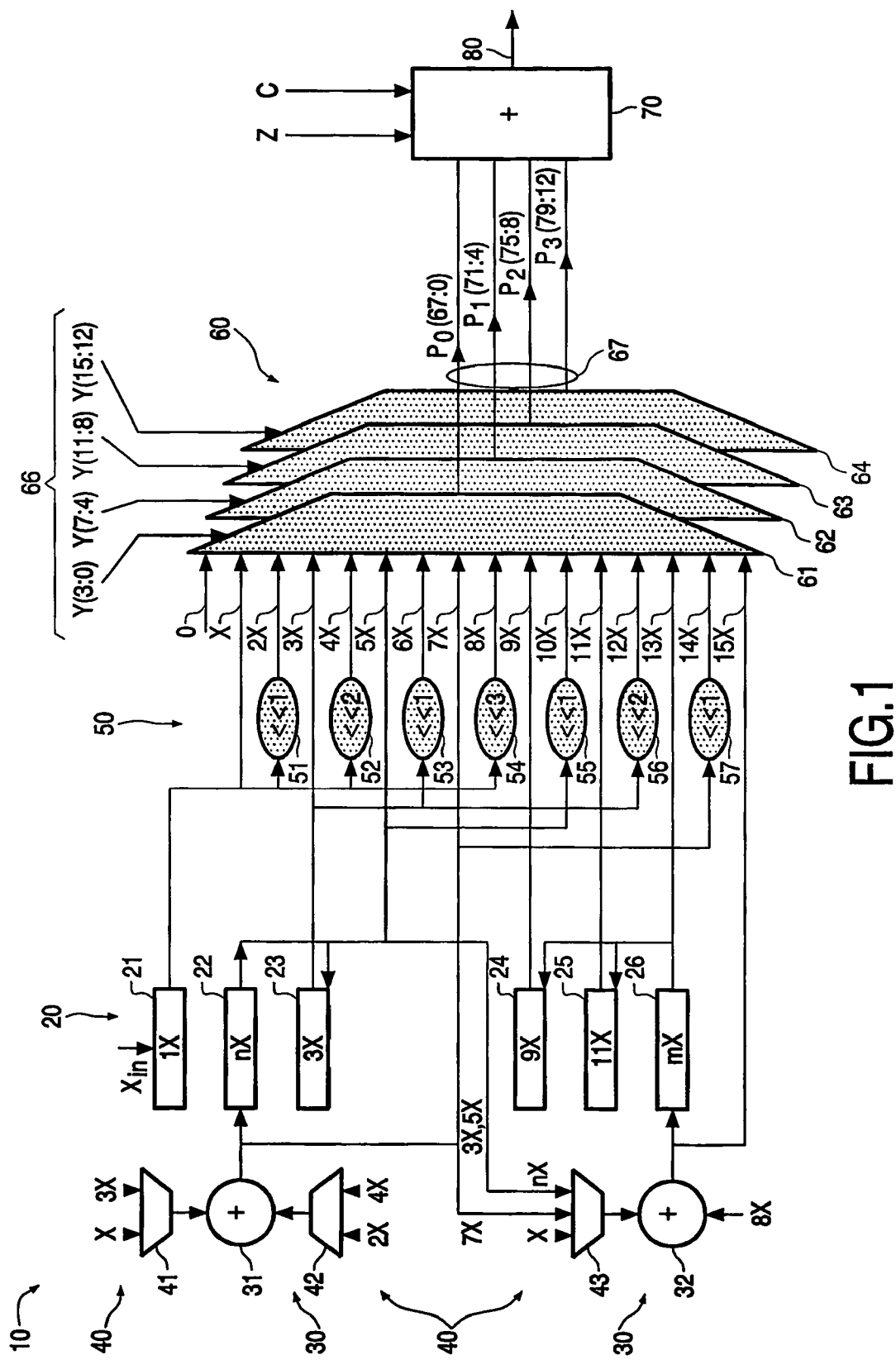

The present invention relates to methods and apparatus for efficiently implementing long integer modular multiplications.

The increasing use of cryptographic algorithms in electronic devices has established a need to quickly and efficiently execute long integer modular multiplications. For example, smart cards and many other electronic devices use a number of cryptographic protocols such as the RSA, and others based on elliptic curve and hyper elliptic calculations. All of these protocols have, as a basic requirement, the ability to perform long integer modular multiplications of the form R=X.Y mod N.

Typically, with protocols such as RSA, the long integers X and Y are 1024-bit, or even 2048-bit integers, and the multiplication operations must be carried out many hundreds or thousands of times to complete an encryption or decryption operation. It is therefore desirable that the cryptographic devices that perform these operations execute the long integer multiplications quickly, using a high speed multiplier.

Conventionally, electronic devices designed to execute such multiplications quickly consume a lot of power, which is undesirable in devices intended to have low power consumption, such as smart cards and other portable electronic devices.

It is therefore an object of the present invention to provide a method for enabling long integer modular multiplication in an apparatus in a manner which reduces power consumption.

According to one aspect, the present invention provides a method of performing modular multiplication of Integers X and Y to produce a result R, where R=X.Y mod N, in a multiplication engine, comprising the steps of:
(a) fragmenting X into a first plurality of words $x_n$ each having a first predetermined number of bits, k;
(b) fragmenting Y into a second plurality of words $y_n$ each having a second predetermined number of bits, m;
(c) pre-calculating multiples of a word $x_n$ of X in a pre-calculation circuit and using said pre-calculated multiples to derive products of the word $x_n$ of X with each of the plurality of words $y_n$ of Y;
(d) computing an intermediate result $R_j$ as a cumulating sum derived from said pre-calculated multiples;
(e) for each successive word of X, repeating the steps of pre-calculating and computing so as to generate successive intermediate results, $R_j$, for each of the first plurality of words $x_n$; and
(f) providing as output each of the intermediate results $R_j$ so as to form a final result.

According to another aspect, the present invention provides an apparatus for performing modular multiplication of integers X and Y to produce a result R, where R=X.Y mod N, comprising:
means for fragmenting X into a first plurality of words $x_n$ each having a first predetermined number of bits, k;
means for fragmenting Y into a second plurality of words $y_n$ each having a second predetermined number of bits, m;
a pre-calculation circuit for pre-calculating multiples of a word $x_n$ of X and using said pre-calculated multiples to derive products of the word $x_n$ of X with each of the plurality of words $y_n$ of Y;
means for computing an intermediate result $R_j$ as a cumulating sum derived from said pre-calculated multiples; and
control means for controlling repetition of the pre-calculations and computing of an intermediate result for each successive word of X so as to generate successive intermediate results, $R_j$, for each of the first plurality of words $x_n$.

According to another aspect, the present invention provides a calculation circuit for providing each of a plurality of multiples of an integer x, to form products x.y, comprising:
adder and shift circuits for deriving a plurality of basic multiples of x;
a plurality of registers for storing at least some of said plurality of basic multiples of x;
a plurality of multiplexers each receiving said basic multiples of x, each multiplexer having selection lines for receiving selected bits of a selected y word; and
a summation circuit for receiving the outputs from each multiplexer and combining them according to the numeric significance of the portion of the y word used as input to the respective multiplexer selection line.

Figure 2:
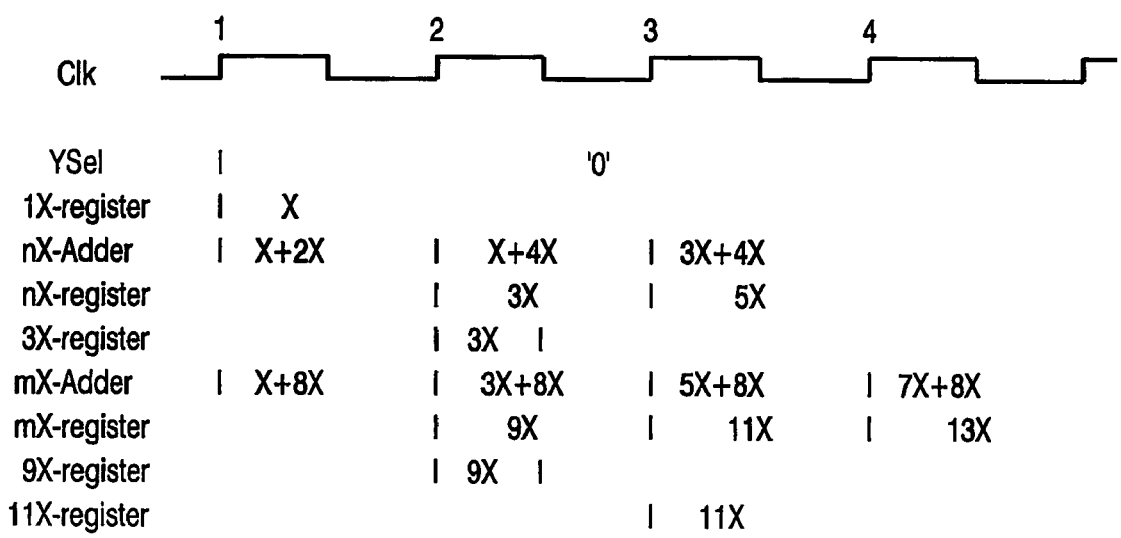
Figure 3:
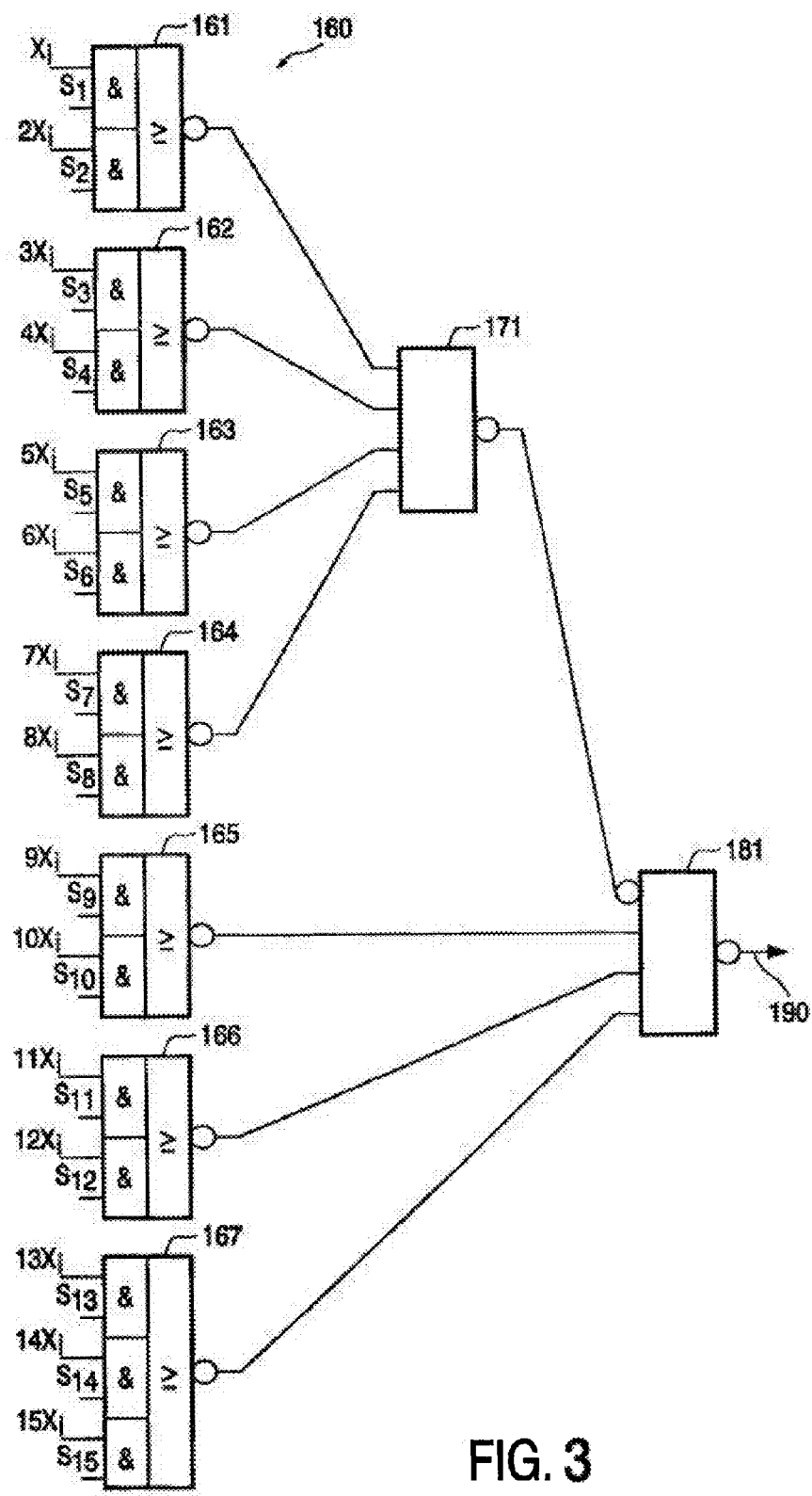
Figure 4:
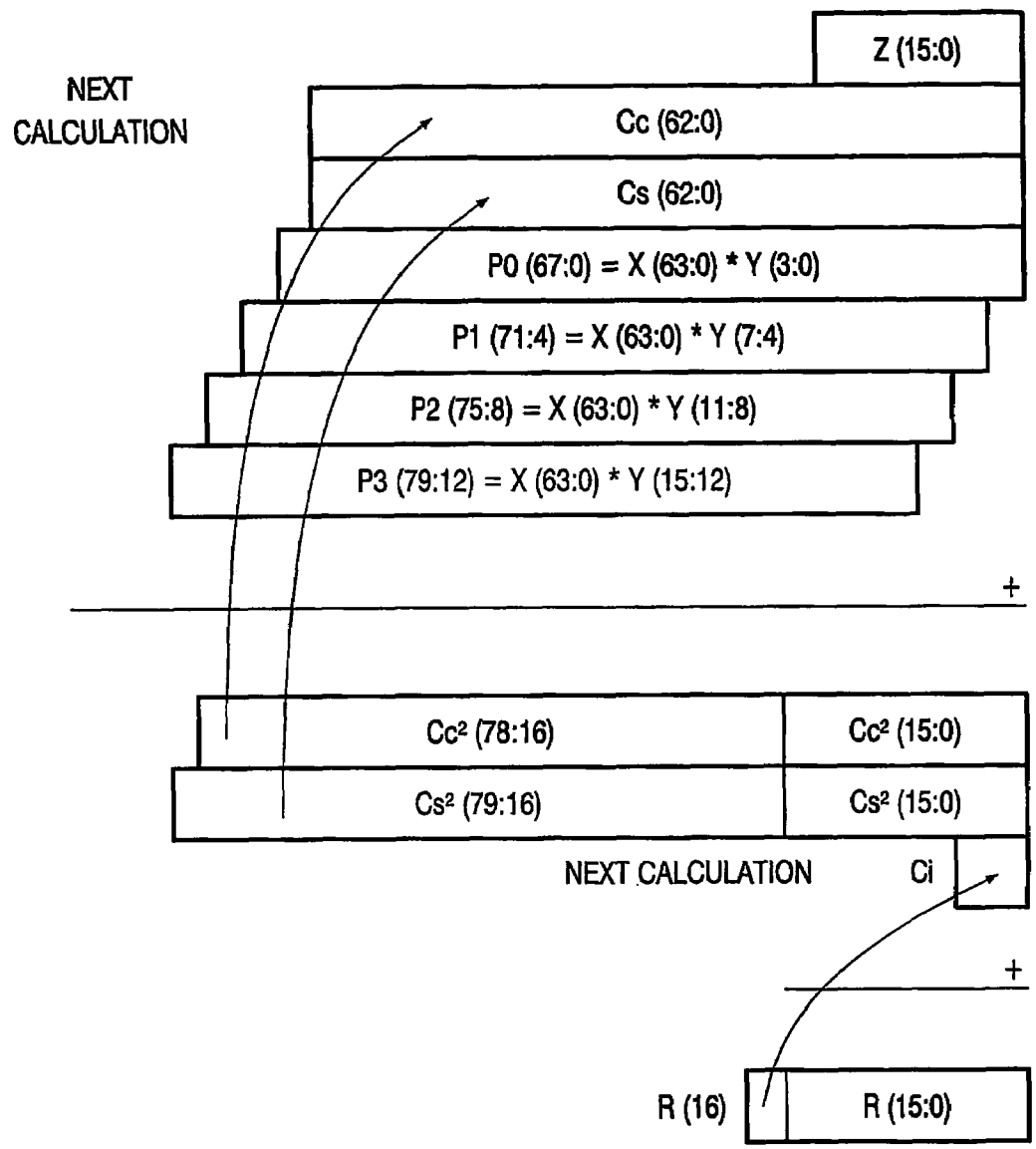

Embodiments of the invention will now be described, by way of example, and with reference to the accompanying drawings in which:

FIG. 1 shows a pre-calculation circuit for a multiplier that generates x.y products from selected basic multiples of x, FIG. 2 shows a timing diagram for operation of the circuit of FIG. 1, FIG. 3 illustrates an alternative multiplexer/adder circuit design to replace that shown in FIG. 1, and FIG. 4 shows schematically a preferred configuration of an adder.

To calculate the product X.Y mod N where X and Y are long-integer variables, eg. of the order of 1024 or 2048 bit length, the long-integer variables X and Y are split into smaller "words" of, for example 32 bits in length. In a preferred embodiment described later, X is split into words of 64 bits in length, and Y is split into words of 16 bits in length.

First, X is split up into n words, generally each of length k, such that:

$$X = x_{n-1} B_x^{n-1} + x_{n-2} B_x^{n-2} + \ldots + x_0$$

where $B_x = 2^k$. In one example, k=32, and in another example k=64.

In this manner, X is fragmented into a plurality of words each of length k bits. Then, the result R can be calculated as follows:

$$R = (((( x_{n-1} Y \bmod N) B_x + x_{n-2} Y) \bmod N) B_x + \ldots x_0 Y) \bmod N$$

$$\underbrace{\phantom{(x_{n-1} Y \bmod N)}}_{R_0}$$
$$\underbrace{\phantom{((x_{n-1} Y \bmod N) B_x + x_{n-2} Y) \bmod N}}_{R_1}$$
$$\underbrace{\phantom{(((( x_{n-1} Y \bmod N) B_x + x_{n-2} Y) \bmod N) B_x + \ldots x_0 Y)}}_{R_{n-1}}$$

Thus, $R_j = (x_{n-j-1} Y + R_{j-1} B_x) \bmod N$

First, we multiply $x_{n-1}$ by the complete Y and calculate the modulus of it. The result is $R_0$. Next, we multiply $x_{n-2}$ by the complete Y, add $Z_0 = R_0.B_x$ to the result and calculate the modulo N reduction. The result is $R_1$. Next, we multiply $x_{n-3}$ by the complete Y, add $Z_1 = R_1.B_x$ to the result and calculate the modulo N reduction. The result is $R_2$. This procedure is repeated until we have used all words of X, $x_0$ being the last word of X to be processed, to obtain the final result $R = R_{n-1}$. However, a multiplier for Y being 1024-bits long is undesirable from a practical viewpoint. Therefore, we also break down Y, and thus $R_j$, into smaller "words" of, for example, 32 bits or 16 bits in length. Therefore, the basic multiplication $R_j = (x_{n-j-1} Y + Z_{j-1}) \bmod N$, with $Z_{j-1} = R_{j-1} B_x$, is also fragmented.

We split Y and $R_j$ into words of m bits in length, ie. $B_y = 2^m$:

$$Y = y_{n-1}B_y^{n-1} + y_{n-2}B_y^{n-2} + \ldots + y_0$$

$$R_j = r_{j,n-1}B_y^{n-1} + r_{j,n-2}B_y^{n-2} + \ldots + r_{j,0}$$

In this manner, Y is fragmented into a plurality of words each of length m bits. Thus:

$$R_j = \underbrace{\underbrace{\underbrace{\underbrace{x_{n-j+1}y_0}_{B_y c_{j,0} + r_{j,0}} + (x_{n-j+1}y_1 + r_{j-1,0})B_y}_{B_y c_{j,1} + r_{j,1}} + (x_{n-j+1}y_2 + r_{j-1,1})B_y^2}_{B_y c_{j,2} + r_{j,2}} + \ldots + (x_{n-j+1}y_{n-1} + r_{j-1,n-2})B_y^{n-1} + r_{j-1,n-1}B_y^n}_{B_y c_{j,n-1} + r_{j,n-1}}$$

For the calculation of $R_j$ we perform the following operations:

First, we multiply $x_{n-j+1}$ by $y_0$ and split the result into 2 parts: the lower part $r_{j,0}$ (m-bits) and the higher part $c_{j,0}$ (k-bits):

$$B_y \cdot c_{j,0} + r_{j,0} = x_{n-j+1} y_0$$

Next, we multiply $x_{n-j+1}$ by $y_1$ and add the previous carry word $c_{j,0}$. Moreover, we add $z_0 = r_{j-1,0}$ too. The result is again split into 2 parts, respectively of k and m bits in length: the lower part $r_{j,1}$ and the higher part $c_{j,1}$:

$$B_y \cdot c_{j,1} + r_{j,1} = x_{n-j+1} \cdot y_1 + c_{j,0} + z_0$$

Next, we multiply $x_{n-j+1}$ by $y_2$ and add the previous carry word $c_{j,1}$. Moreover, we add $z_1 = r_{j-1,1}$ too. The result is again split into 2 parts, respectively of k- and m-bits in length: the lower part $R_{j,2}$ and the higher part $c_{j,2}$:

$$B_y \cdot c_{j,2} + r_{j,2} = x_{n-j+1} \cdot y_2 + c_{j,1} + z_1$$

This procedure is repeated until we perform the last multiplication, by $y_{n-1}$, ie. we multiply $x_{n-j+1}$ by $y_{n-1}$ and add the previous carry word $c_{j,n-2}$. Moreover, we add $z_{n-2} = r_{j-1,n-2}$ too. The result is again split into 2 parts, respectively of k- and m-bits in length: the lower part $r_{j,n-1}$ and the higher part $c_{j,n-1}$:

$$B_y \cdot c_{j,n-1} + r_{j,n-1} = x_{n-j+1} \cdot y_{n-1} + c_{j,n-2} + z_{n-2}.$$

The last step is the addition of $c_{j,n-1}$ and $z_{n-1}$: $r_{j,n-1} = c_{j,n-1} + z_{n-1}$.

It will be seen that, in a general aspect, we calculate the products of a first word of X with each of the plurality of words of Y, and compute an intermediate result $R_j$ as a cumulating sum derived from each stored product.

In a further general sense, the calculation is implemented by
(i) obtaining a product, x.y,
(ii) adding a carry word $c_j$, from a previous term (which is, of course, zero when calculating the first term);
(iii) adding a corresponding term, z, from a previous intermediate result (which is, of course, also zero when calculating at least the first $R_j$);
(iv) fragmenting the result into a lower order m-bit word and a higher order, k-bit carry word;
(v) repeating steps (i) to (iv) for each of the stored products; and
(vi) after consumption of all stored products, forming a final term by adding the final carry word and corresponding term from the previous intermediate result.

Now $R_j$ is complete and is larger than the Y variable from which it was derived by the length of one word of X. The size of $R_j$ is preferably reduced by one word in a modulo N reduction, and the reduced result is then used a $z_j$ during the calculation of the subsequent $R_{j+1}$.

The above calculation described the general procedure where the length of the X words ($x_n$) is the same as the length of the y words ($y_n$), ie. $B_x = B_y$.

The X words may be different in length than the Y words. For example, if k/m>1, k=64 and m=16, then $B_x = B_y^4$, then:
1. The addition of z has to be shifted by k/m (=4, in the example) words is instead of 1 word. In other words, during the first k/m (=4) multiplications, z=0. Thus, in step (iii) discussed above, in the adding of a corresponding term, z, from a previous intermediate result $R_{j-1}$, the 'corresponding term' is the fourth less significant word from the previous intermediate result $R_{j-1}$ instead of the immediate less significant word from the previous intermediate result.
2. The carry word $c_{j,i}$ used in step (ii) is k/m (=4) times larger (4m bits in length) than the result $r_{j,i}$ (m bits in length).
3. The last step (vi) above consists of k/m=4 additions of the carry word and the z word (the corresponding term from the previous intermediate result). In every addition, the carry word is reduced by m-bits.

Thus, in the basic operation, omitting all indices:

$$B.c + r = x.y + c + z$$

During, the first operation, c=0
During the first k/m operations, z=0.
During the last k/m-operations, y=0.

x is kept constant during the complete series of operations for each calculation of $R_j$. The fact that the value of the x word remains constant throughout the iterative computations for each intermediate result $R_j$ can be used to substantially reduce the processing power needed to execute the long word multiplications of X and Y mod N.

In performing a conventional 32 bit by 32 bit multiplication, it is necessary to add 32 products, the carry and the Z term. Therefore, there is an addition of 34 terms, each 32 bits in length. Such an addition, when performed at high speed, requires a lot of power.

It will be noted, in the foregoing algorithm, that for each intermediate term $R_j$, one of the multiplicands (namely x) remains constant throughout the entire series.

Therefore, before commencing the calculations for $R_j$, a number of multiples of $x_{n-j+1}$ are pre-calculated and stored or latched. Returning to the example above, for a long word X fragmented into 64 bit words (x), and for Y split into 16 bit words (y), this may be effected using a pre-calculation circuit according to a number of different designs.

In a first example, the pre-calculation circuit 10 may comprise a look-up table 11 which is pre-loaded with each possible multiple of x stored at a respective row (or column) address. The look-up table could be populated using an appropriate adder circuit. The look-up table would then be accessed for each x.y multiple by using the appropriate read row (or column) address.

However, such an arrangement would not be efficient in populating the look-up table with all the possible x.y products (there would be 65536 for all products where the y words are 16 bit).

A preferred technique is to use a pre-calculation circuit that calculates and stores selected basic multiples of x, and determines all other values of x 'on the fly' by appropriate shifting and/or adding operations from the selected basic multiples of x.

An example of such a pre-calculation circuit is shown in FIG. 1, suitable for pre-calculating all multiples of 64 bit x words with 16 bit y words. Pre-calculation circuit 10 includes:

six registers 21 ... 26 (collectively designated as registers 20) for storing pre-selected basic multiples of x;

two adders 31, 32 (collectively designated as input adders 30) for deriving pre-determined basic multiples of x;

three multiplexers 41, 42, 43 (collectively designated as input multiplexers 40) for providing inputs to the input adders 30, 31 during the calculation of the pre-selected basic multiples of x;

seven bit shifters 51 ... 57 (collectively designated as bit shifters 50) for aligning the pre-selected basic multiples of x;

four output multiplexers 61 ... 64 (collectively designated as multiplexers 60) for selecting appropriate basic multiples of x as outputs; and an output adder 70 for combining the output multiples of x to obtained the desired x.y product.

Each of registers 20 stores a pre-selected basic multiple of x. Register 21 stores the value $1x$. Register 23 stores the value $3x$, which is provided by input adder 31 combining $1x$ and $2x$ via input multiplexers 41 and 42. Register 22 stores the value of $5x$, which is provided by adder 31 combining $3x$ and $2x$ via input multiplexers 41 and 42. The multiple $7x$ is provided directly from the input adder 31 by a combination of $4x$ and $3x$ from input multiplexers 41 and 42 at all other times, to save one register. Register 24 stores the value of $9x$, which is provided by input adder 32 combining $8x+1x$ via input multiplexer 43. Register 25 stores the value of $11x$, which is provided by input adder 32 by a combination of $8x$ and $3x$ from input multiplexer 43. Register 26 stores the value of $13x$, which is provided by input adder 32 combining $8x$ and $5x$ via input multiplexer 43. The multiple $15x$ is provided directly from the input adder 32 by a combination of $7x$ (from adder 31) and $8x$ at all other times, to save another register.

The even values need not be stored in any register because they can be obtained from simple left shifting of an appropriate basic multiple register 20 using an appropriate one of the bit shifting functions 50. Specifically, $2x$ is obtained by a 1-bit left shift of the content of the $1x$ register 21; $4x$ is obtained by a 2-bit left shift of the content of the $1x$ register 21; $6x$ is obtained by a 1-bit left shift of the $3x$ register 23; $8x$ is obtained by a 3-bit left shift of the content of $1x$ register 21; $10x$ is obtained by a 1-bit left shift of the content of the $5x$ register 22; $12x$ is obtained by a 2-bit left shift of the $3x$ register 23; and $14x$ is obtained by a 1-bit left shift of the output of adder 31. These bit shifting functions can be implemented by appropriate wiring of the registers 20 to the inputs of the multiplexers 60.

Thus, overall, the number of registers (or memory spaces) for the basic multiples has been reduced from 16 to just six. In a preferred arrangement, the x register 21, nx register 22 and mx register 26 are implemented as flip-flops, while the other registers 23, 24, 25 are latches.

These sixteen basic multiples of x are selected for output by the four output multiplexers 60, each multiplexer receiving as selection input 66 four respective bits of the 16-bit y value. As shown, output multiplexer 61 receives the four least significant bits (3:0) of the y word; output multiplexer 62 receives the next four significant bits (7:4) of the y word; output multiplexer 63 receives the next four significant bits (11:8) of the y word; and output multiplexer 64 receives the four most significant bits (15:12) of the y word. The respective outputs $P_0$, $P_1$, $P_2$, $P_3$ (collectively designated as outputs 67) of the output multiplexers 60 are each shifted relative to one another in order to provide the correct relative significance of output. Specifically, multiplexer 61 supplies $P_0$ as bits (67:0) of the x.y product; multiplexer 62 supplies $P_1$ as bits (71:4) of the x.y product; multiplexer 63 supplies $P_2$ as bits (75:8) of the x.y product; and multiplexer 64 supplies $P_3$ as bits (79:12) of the x.y product. Of course, each of these outputs must be combined by adder 70 in order to obtain the correct value for x.y.

The combination of the outputs $P_0$ ... $P_3$ are preferably added together in adder 70 at the same time as the value z (the corresponding term from a previous intermediate result) and the carry word c from a previous term, to get the result r and the new carry c.

The pre-calculation circuit or look-up table has to provide the multiples of x ranging from $0, x \ldots 15x$. With reference to FIG. 2, it will be seen that the pre-calculation circuit of FIG. 1 can generate all the basic multiples of x within 4 clock cycles.

At the start of the first cycle, the new x value is clocked into the $1x$ register. During the first cycle, the nx adder 31 is connected to x and $2x$ and the mx adder 32 is connected to x and $8x$. At the start of the 2nd cycle, the result $3x=x+2x$ is stored in the nx register 22 and the result $9x=x+8x$ is stored in mx register.

At the transition to the second cycle, $3x$ is transferred from the nx register 22 to the $3x$ register 23 and $9x$ is transferred from the mx register 26 to the $9x$ register 24. During cycle 2, the nx adder 31 is connected to x and $4x$ and the mx adder 32 is connected to the nx register 22 and to $8x$, so the adders 31, 32 respectively calculate $5x=x+4x$ and $11x=3x+8x$.

At the transition to the third cycle, the result $5x$ is stored in the nx register 22 and $11x$ is stored in the mx register 26. During the first part of the third cycle, $9x$ is transferred from the mx register 26 to the $9x$ register 24. During the third cycle, the nx adder 31 is connected to $3x$ and $4x$ and the mx adder 32 is connected to nx and $8x$, so the adders 31, 32 respectively calculate $7x=3x+4x$ and $13x=5x+8x$.

During the fourth cycle, the mx adder 32 is connected to the output of the nx adder 31 and to $8x$, so that the mx adder 32 calculates $15x=7x+8x$. The output of the adders ($7x$ and $15x$) are not stored but used as direct input for the output multiplexers 60.

Preferably, for optimum efficiency, the four clock cycles used to generate the sixteen multiples of x are taken during the final part of the computation of the intermediate result $R_j$ when it will be noted that the final term in the cumulating sum calculation does not require the use of an x.y product, adding only z and c terms (because x=0 for that final term). During this period, the outputs $P_0 \ldots P_3$ of the multiplexer 60 must be driven to zero, eg. by selection of the '0' input in each case.

From the foregoing description, it will become clear that it is also possible to vary the configuration of the pre-calculation circuit is a number of ways. For example, the number of multiplexers could be increased to eight, each receiving a 2-bit input of the y word. Similarly, using 3-bit inputs of the y word would require five multiplexers and one normal and-product.

In a general sense, the pre-calculation circuit uses a plurality of multiplexers each of which receives the basic multiples of x and each of which has selection lines for receiving selected bits of a y word and a summation circuit for receiving the outputs from each multiplexer and combining them according to the numeric significance of the portion of the y word used as input to the respective multiplexer selection line.

With reference to FIG. 3, an alternative form of output multiplexer 160 is illustrated. A potential disadvantage to the type of output multiplexers 60 used in the embodiment of FIG. 1 is that the multiplexers will be switched even when the outputs are not selected—only one output of each multiplexer 61 . . . 64 will ever be required at one time, and in many cases no output will be required of a particular multiplexer. For example, when switching from 1x to 12x, only the output of multiplexer 61 will change. Multiplexers 62, 63 and 64 will still require zero output. The switching of each multiplexer results in unnecessary power dissipation. Therefore, an alternative arrangement of multiplexer 160 is as shown in FIG. 3.

Each of the basic multiples x . . . 15x is provided as input and selected by a respective selection line $S_1 \ldots S_{15}$. The requisite basic multiples of x are selected (and partially summed when required) by logic gates 161 . . . 167. The outputs from logic gates 161 . . . 167 are also summed by adders 171 and 181 to produce a final output x.y at output 190. In this arrangement, only the affected logic gates 161 . . . 167 are switched when the selection input changes. For example, when the x multiple required changes from 1x to 5x, only logic gates 161 and 163 will be switched. All other inputs and outputs of the gates 162 and 164 . . . 167 will not be switched, resulting in a reduced power consumption. Only the minimum number of logic gates are switched for any given change in control input.

Therefore, in a general sense, it will be recognised that the plurality of output multiplexers comprises a set of logic gates 161 . . . 167 each having a first input $x_i$ connected to receive a respective basic multiple of x, and a selection line $S_i$ to enable assertion of the basic multiple at an output of the logic gate. The summation circuit comprises a set of adders (partly in each logic circuit 161 . . . 167 and in circuits 171, 181) for receiving all asserted outputs of the series of logic gates, and combining them according to the numeric significance of the portion of y word used as input to the multiplexer selection line.

A preferred configuration of adder 70, which adds the four products $P_0 \ldots P_3$, the z-term and the carry term c, is of a carry-save-adder type, as shown schematically in FIG. 4.

Only the least significant 16 bits (R(15:0)) are added by a full adder. This means that we have to add two feedback terms Cc' and Cs' (the carry-term is the sum of both). These terms are added after a shift over 16 bits.

In fact, Cc'(78:0) and Cs'(78:0) are stored in flip-flops. In the next clock cycle, the higher parts (Cc'(78:16) and Cs'(79:16)) are input to the adder as Cc(62:0) and Cs(62:0), as shown by the arrows. Cc'(15:0) and Cs'(15:0), together with the previous carry-bit ci=R(16), are added by a full adder, with R(16:0) as result.

R(15:0) is stored successively in a suitable memory, eg. a RAM. R(16) is added in the next clock cycle as ci.

Z(15:0) from intermediate results of $R_j$ are stored successively in a suitable memory, eg. a RAM, and are read for each relevant operation from the memory.

The invention claimed is:

1. A method for implementing a cryptographic algorithm in an electronic device that includes performing modular multiplication of integers X and Y to produce a result R, where R=X.Y mod N, in a multiplication engine, the method comprising the steps of:
   (a) fragmenting X into a first plurality of words $x_n$ each having a first predetermined number of bits, k;
   (b) fragmenting Y into a second plurality of words $y_n$ each having a second predetermined number of bits, m;
   (c) pre-calculating multiples of a word $x_n$ of X in a pre-calculation circuit and using said pre-calculated multiples to derive products of the word $x_n$ of X with each of the plurality of words $y_n$ of Y;
   (d) computing an intermediate result $R_j$ as a cumulating sum derived from said products;
   (e) for each successive word of X, repeating the steps of pre-calculating and computing to generate successive intermediate results, $R_j$, for each of the first plurality of words $x_n$;
   (f) providing as output each of the intermediate results $R_j$ to form a final result; and
   (g) using the final result to complete an encryption or decryption operation within the electronic device.

2. The method of claim 1 in which X fragmented into n words of k bits each, according to the expression $$X = x_{n-1} B_x^{n-1} + x_{n-2} B_x^{n-2} + \ldots + x_0, \text{ where } B_x = 2^k.$$

3. The method of claim 1 in which Y is fragmented into n words of m bits each, according to the expression $$Y = y_{n-1} B_x^{n-1} + y_{n-2} B_x^{n-2} + \ldots + y_0, \text{ where } B_y = 2^m.$$

4. The method of claim 1 in which step (f) further includes combining all the intermediate results $R_j$ to form R, according to the expression $$R = ((((x_{n-1} Y \bmod N) B_x + x_{n-2} Y) \bmod N) B_x + \ldots x_0 Y) \bmod N.$$

5. The method of claim 1 in which the steps of pre-calculating comprise the steps of:
   calculating pre-selected basic multiples of the word of X and
   combining selected ones of the basic multiples to form a desired x.y product.

6. The method of claim 1 in which the step of computing an intermediate result $R_j$ comprises generating a succession of terms x.y+c+z for addition, comprising the steps of:
   (i) reading a pre-calculated multiple of a word $x_n$ of X to form an $x_n$-$y_n$ product,
   (ii) adding a carry word $c_j$, from a previous term;
   (iii) adding a corresponding term, z, from a previous intermediate result;
   (iv) fragmenting the result into a lower order in-bit word and a higher order, k-bit carry word;
   (v) repeating steps (i) to (iv) for each of the $x_n$-$y_n$ products; and
   (vi) after use of all $x_n$-$y_n$ products, forming a final term by adding the final carry word and corresponding term from the previous intermediate result.

7. The method of claim 6 wherein the step of computing the intermediate result is implemented as:

$$R_j = x_{n-j+1}y_0 + (x_{n-j+1}y_1 + r_{j-1,0})B_y + (x_{n-j+1}y_2 + r_{j-1,1})B_y^2 + \ldots + (x_{n-j+1}y_1 + r_{j-1,n-2})B_y^{n-1} + r_{j-1,n-1})B_y^n.$$

8. The method of claim 6 in which step (i) comprises the steps of reading selected basic multiples of the word $x_n$ of X and combining them to obtain the product $x_n \cdot y_n$.

9. The method of claim 8 in which steps (i), (ii) and (iii) include combining the selected basic multiples the word of X, the carry word $c_j$, and the corresponding term z in an adder circuit.

10. The method of claim 6 in which the corresponding term z from a previous intermediate result is the immediate less significant word from the previous intermediate result.

11. The method of claim 6 in which the corresponding term z from a previous intermediate result is a (k/m)th less significant word from the previous intermediate result.

12. The method of claim 6 in which the pre-calculation of multiples of a word of X takes place during step (vi) for the previous word.

13. Apparatus for performing modular multiplication of integers X and Y to produce a result R, where R=X.Y mod N, comprising:
   means for fragmenting X into a first plurality of words $x_n$ each having a first predetermined number of bits, k;
   means for fragmenting Y into a second plurality of words $Y_n$ each having a second predetermined number of bits, m;
   a pre-calculation circuit for pre-calculating multiples of a word $x_n$ of X and using said pre-calculated multiples to derive products of the word $x_n$ of X with each of the plurality of words $y_n$ of Y;
   means for computing an intermediate result $R_j$ as a cumulating sum derived from said products; and
   control means for controlling repetition of the pre-calculations and computing of an intermediate result for each successive word of X to generate successive intermediate results, $R_j$, for each of the first plurality of words $x_n$.

14. The apparatus of claim 13 in which the means for computing an intermediate result $R_j$ generates a succession of terms x.y +c +z for addition, including:
   (i) means for reading a pre-calculated multiple of a word x of X to form an x.y product,
   (ii) means for adding a carry word $c_j$, from a previous term;
   (iii) means for adding a corresponding term, z, from a previous intermediate result;
   (iv) means for fragmenting the result into a lower order m-bit word and a higher order, k-bit carry word;
   (v) control means for effecting repetition of the reading of a pre-calculated multiple and addition of the carry word and corresponding term for each of the x.y products and forming a final term by adding the final carry word and corresponding term from the previous intermediate result.

15. The apparatus of claim 14 further comprising an adder circuit configured to combine the selected basic multiples of the word of X, the carry word $c_j$, and the corresponding term z.

16. The apparatus of claim 14, wherein the corresponding term z from the previous intermediate result is the immediate less significant word from the previous intermediate result.

17. The apparatus of claim 14, wherein the corresponding term z from the previous intermediate result is a (k/m)th less significant word from the previous intermediate result.

18. The apparatus of claim 13, wherein the pre-calculation circuit comprises:
   adder and shift circuits for deriving a plurality of basic multiples of x;
   a plurality of registers for storing at least some of said plurality of basic multiples of x;
   a plurality of multiplexers each receiving said basic multiples of x, each multiplexer having selection lines for receiving selected bits of a selected y word; and a summation circuit for receiving the outputs from each multiplexer and combining them according to the numeric significance of the portion of the y word used as input to the respective multiplexer selection line.

19. The apparatus of claim 18, wherein the plurality of registers correspond to selected odd basic multiples of x, even basic multiples of x being provided to each multiplexer by bit shifting lines coupled to selected ones of the plurality of registers.

20. The apparatus of claim 18, wherein the plurality of multiplexers comprises a set of logic gates, each having a first input connected to receive a respective basic multiple of x, and a selection line to enable assertion of the basic multiple at an output thereof, wherein the summation circuit comprises a series of adders for receiving all asserted outputs of the series of logic gates, wherein only logic gates in the set of logic gates for which a selection input has changed will be switched during a change in the selected y word.

* * * * *